(Model.)
J. ANGUS.
REFRIGERATOR.
No. 246,993. Patented Sept. 13, 1881.
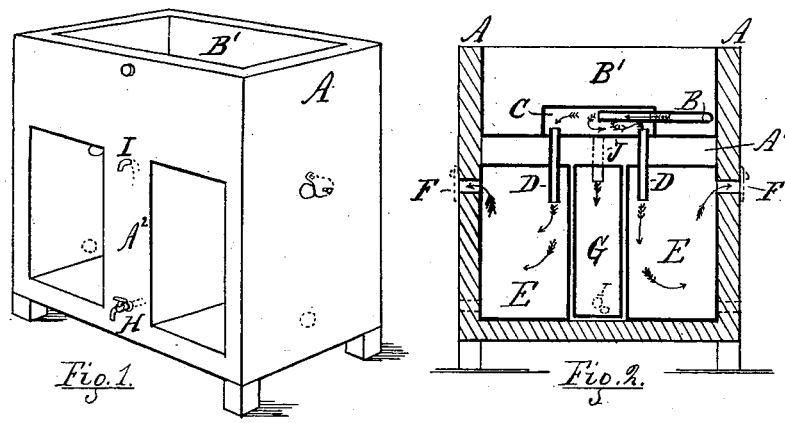
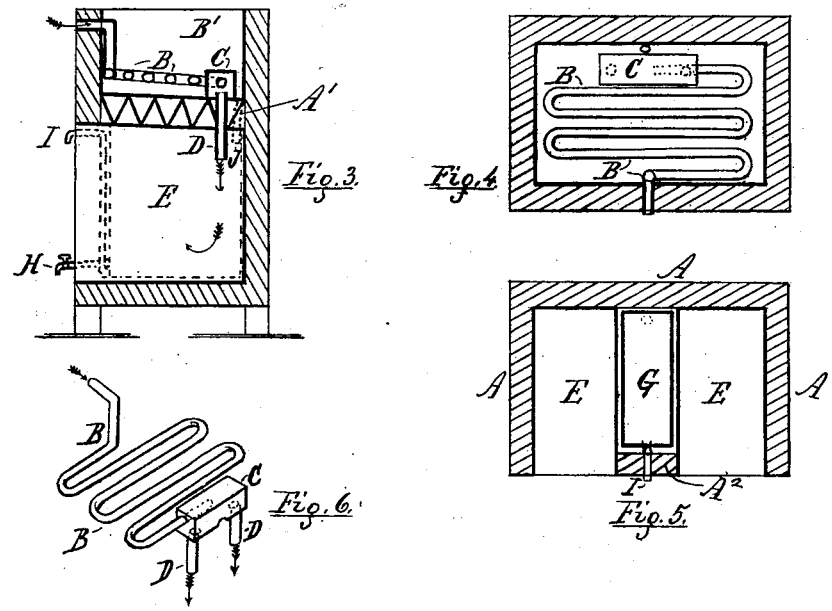
Witnesses.
George Jarvis
Inventor.
John Angus

UNITED STATES PATENT OFFICE.

JOHN ANGUS, OF NEW YORK, N. Y.

REFRIGERATOR.

SPECIFICATION forming part of Letters Patent No. 246,993, dated September 13, 1881.

Application filed May 14, 1881. (Model.)

*To all whom it may concern:*

Be it known that I, JOHN ANGUS, of the city, county, and State of New York, have invented an Improvement in Refrigerators, of which the following is a specification.

The object of my improvement is to automatically supply fresh, cold, and perfectly-dry air to one or more provision-chambers in continuous currents, and to prevent the odors of one article of food from affecting another in the same chamber, and especially to keep the atmosphere within the provision-chambers as dry as possible, which result I believe to be fully secured by my improvement herein described.

My invention consists in a combination of a cooling or supply tube forming an air-duct, a cooling, condensing, and distributing chamber, and one or more distributing, discharging, or outlet tubes leading from said condensing and distributing chamber to one or more provision-chambers.

The above combination of three elements constitutes a means of cooling and supplying air by passing it through the ice-chamber without its coming in contact with the ice, the condensing-chamber operating to collect any sweat, drip, or water, (should any collect in the passage,) and preventing its passage or escape into the provision-chamber, as I especially desire to supply cold dry air as free from moisture as possible. The arrangement is such that a continuous descent is obtained for the air-currents on the principle that cold air descends, thereby making the supply self-acting and perpetual; and, further, to render this effectual and keep up the supply in continuous currents, I provide, at a suitable part of the provision chamber or chambers, outlet or ventilating apertures, (dampered or not,) so that the warm air rising within will make its escape, readily carrying off at the same time all odors, steam, &c., and keeping the interior dry, pure, and wholesome.

In the accompanying drawings, Figure 1 represents exterior in perspective; Fig. 2, section from side to side; Fig. 3, section from front to rear; Fig. 4, horizontal section through ice-chamber; Fig. 5, horizontal section through provision-chambers and water-tank. Fig 6 represents the supply-tube, condensing and distributing chamber, and two distributing or discharging tubes, all in perspective. Fig. 2 shows section of said chamber, discharging-tubes, and portion of supply-tube. A section crosswise the same is shown in Fig. 3.

A represents outside walls of a refrigerator; A', the division between ice-chamber and one or more provision-chambers; $A^2$, the division or space between the provision-chambers.

B is the cooling and supply tube (or air-duct) communicating with the outer air, receiving supply therefrom. It has no communication between its interior and the ice chamber.

C is the condensing, cooling, and distributing chamber, to which is attached the supply-tube B in such manner that air may be supplied to interior of condensing and distributing chamber C.

It is not material at what point or through which side the tube B is connected, as it might be through the top or either side, and the tube may be of any suitable length, size, or shape, or bent in any direction, so long as proper descent is obtained, and distance for cooling the air; also, the size, shape, or location of chamber C, I do not confine, as it may be large enough to distribute for many provision-chambers or limited to only one, as requisite; and it may be of any shape desirable or most convenient, and it may be located wherever economy and efficiency may indicate. I prefer that the ice shall rest upon the tube B, and probably upon the top of chamber C, as I desire to get as much cooling effect as possible, the air being cooled in both.

Out of the condensing and distributing chamber C proceed the distributing or discharging tubes D, (one or more, as desired,) the upper ends being elevated sufficiently above the bottom of chamber C to effectually prevent water or drip from getting into them, and thence to provision-chambers. The tubes D pass downward and enter provision chamber or chambers E E.

An outlet is provided leading from chamber C, for escape of water, and it may be carried carried therefrom in any suitable manner and to any suitable place.

At F are shown ventilating-apertures for escape of warm air, gases, &c., from provision-chambers E.

Below the ice-chamber B', and between provision-chambers E E, (when two are used,) I place a water-tank, G, having its own walls separate and distinct from the walls of the said provision-chambers E, and so arranged that there will be some space between said walls to be filled with non-conducting material, or left as dead-air space. Said tank G reaches to bottom of refrigerator, and is provided with faucet H and overflow-pipe I, the overflow proceeding downward from bottom of tank curving upward, forming a trap to prevent inflowing air-currents escaping to interior of tank, and thence to ice-chamber, &c.

A tube-connection, J, provides means for water to enter tank from ice-chamber B'.

The operation is as follows, viz: Ice being placed into the ice-chamber B', resting upon the tube B and chamber C, the covers are shut, and ice-chamber made air-tight. Soon the air within the chamber C becomes cooled, and descends through distributing-tubes D to interior of provision-chamber E, being followed up by air from supply-tube B, which draws air from outside the refrigerator, cooling it in its passage, and it is still further cooled in chamber C all the time. As the cold air enters provision chamber or chambers E it descends to the bottom, while the warm air, &c., rises and escapes through apertures F, and this process is continuous. All the moisture from sweat, &c., which may get in the tube B is collected in chamber C, and as the tubes D are extended above its bottom the water cannot enter them, and as they do not come in contact with the ice there is no sweat in them, so that the air-current is delivered in a dry state.

The condensing-chamber C is a very important part of my invention, as without it the sweat from tube B would enter provision-chambers, and, again, without it as a distributer separate pipes would be necessitated wherever more than one provision-chamber was required, adding greatly to the expense. While I have found by experience and practice that a break must be made between the supply-tube and the provision-chamber, (and this I accomplish by chamber C,) of course it must be proportioned properly with regard to its supply and its discharge, and it is absolutely necessary to prevent accumulation of moisture from reaching the provision-chamber, whether one or more are used.

The above combination of supply-tube B, condensing-chamber C, and distributing-tube D (one or more) may be applied to any refrigerator wherein the ice-box is air-tight, and located sufficiently high, and wherein the arrangement of provision-chambers will admit, the essentials being proper descent and a tight ice-chamber having no communication with provision-chambers.

The provision chamber or chambers may have any amount of ventilation, and the apertures may be provided with valves or dampers; but it is essential that there should be some outlet therefrom to keep the cold-air current in motion.

What I claim as my invention, and desire to secure by Letters Patent, is—

The combination of the supply and cooling tube B, cooling, distributing, and drip-collecting or condensing chamber C, and one or more air-discharging tubes, D, as and for the purpose described and set forth.

JOHN ANGUS.

In presence of—
GEORGE BENNETT,
SAMUEL STONE.